United States Patent
Uhlmann

[15] 3,689,823
[45] Sept. 5, 1972

[54] HIGH VOLTAGE ELECTRIC NETWORK

[72] Inventor: Erich Uhlmann, Ludvika, Sweden

[73] Assignee: Allmanna Svenska Elekriska Aktiebolaget, Vasteras, Sweden

[22] Filed: March 1, 1971

[21] Appl. No.: 119,731

[30] Foreign Application Priority Data

Feb. 27, 1970 Sweden .....................2566/70

[52] U.S. Cl. ....................321/2, 321/27 R, 307/82
[51] Int. Cl. .............................................H02m 7/00
[58] Field of Search .....................321/2, 27; 307/82

[56] References Cited

UNITED STATES PATENTS

| | | | |
|---|---|---|---|
| 2,730,667 | 1/1956 | Uhlmann | 321/2 |
| 3,526,779 | 9/1970 | Uhlmann | 321/2 |

FOREIGN PATENTS OR APPLICATIONS

| | | | |
|---|---|---|---|
| 164,956 | 10/1958 | Sweden | 321/2 |

*Primary Examiner*—William M. Shoop, Jr.
*Attorney*—Jennings Bailey, Jr.

[57] ABSTRACT

A high voltage electric network has an AC part and a DC part and a converter station connecting the parts. An arrangement is provided for controlling the converter station to maintain a predetermined power exchange between the two parts of the network and to dampen oscillations arising in the AC part. The AC part has two portions as seen from the connection point of the converter station. The converter station is connected to the AC part by an inductive member which has an intermediate output connected to the portion of the AC part of lower impedance while one end of the inductive member is connected to the converter and the other end portion of the AC part.

7 Claims, 6 Drawing Figures

PATENTED SEP 5 1972

3,689,823

INVENTOR.
ERICH UHLMANN
BY
Jeremy Bailey, Jr

HIGH VOLTAGE ELECTRIC NETWORK

BACKGROUND OF THE INVENTION

1. Field of the Invention

The present invention relates to a high voltage electric network comprising an AC part and a DC part connected together over a converter station intended to be controlled, among other things, to counteract any oscillations arising in the AC part. For this reason the power transmission between the two parts of the network is altered in relation to such oscillations.

2. The Prior Art

A network of the type in question may be as shown in U.S. Pat. No. 3,526,779, where the AC network in question is connected to another AC network over a DC link, a so-called asynchronous link, because the two AC networks are connected asynchronously. The network may also be constructed according to U.S. Pat. No. 3,275,838, in which the DC link, a so-called synchronous link, joins two synchronously operating points or parts of the network within one and the same AC network.

In the various cases it is shown that, besides transmitting a certain set power, the average power, the DC link may also be used to dampen any oscillations arising in the AC network concerned by temporarily altering the DC power transmitted. Such oscillations are caused by disturbances in the form of connections or disconnections — usually unintentional, for example due to earth faults or short-circuits — of rotating machines or parts of the network. This causes unbalance in the power distribution between the various rotating machines, some of these being retarded while others are accelerated, upon which an oscillation arises in the frequency between the different parts of the network.

As mentioned in the patents referred to above, such oscillations can be dampened by modulation of the DC power transmitted, the rotating machine or machines in the vicinity of the DC link connection to the AC network being accelerated or retarded so as to acquire the same speed as the machine further away in the network.

As mentioned, the oscillations are dampened by altering the power transmitted between the DC link and said machines. This additional power, which may be positive or negative, is transmitted together with the average power to the network and thus to the machines through the normal electric circuits of the network, whereas in principle the most economic way would be for the additional power to be supplied directly to the rotating masses, that is the machine shafts, since it is these which must be accelerated or retarded. In practice, however, this is not possible, as the electrical transmission of the additional power raises a problem because of the network ractances.

The machines are connected together over electric circuits which include not only the real network reactances but also the reactances of the machines themselves, which must also be taken into consideration in the network reactances. This means that it is unavoidable that the additional power which is supplied to or withdrawn from the machine connections must pass a part of the reactance included in the connections between the machines. This means both for the synchronous and the asynchronous DC link that the DC link must use a part of the network reactance to transmit the additional power. This makes poorer use of the additional power, as will be explained later.

SUMMARY OF THE INVENTION

This drawback is avoided according to the present invention which is based on the use of a reactance having an intermediate output, a so-called compensation reactor, which is connected upon the connection of the DC link to the AC network in such a way as to connect the machine or machines in the vicinity of the DC link connection or that part of the AC network containing these machines to said output on said reactor, whereas the rest of the network on the one hand and the converter station of the DC link on the other hand are connected, each to one end of the reactor. In this way the voltages induced in the reactor will compensate the effect of the additional power being transmitted over a part of the network reactance.

A reactor of the type mentioned is known per se, see for example from U.S. Pat. No. 2,899,628, but for other purposes. According to the present invention, the reactor is used to facilitate stabilization of the AC network and this is possible in spite of the fact that connection of the reactor causes an increase in the network reactance, which otherwise reduces the stability.

BRIEF DESCRIPTION OF THE DRAWINGS

The invention will be further described with reference to the accompanying drawings in which FIGS. 1 and 2 show examples of high voltage networks of the type in question, while

DESCRIPTION OF THE PREFERRED EMBODIMENTS

When dealing with the oscillation phenomenon in a selected AC network, this network must be analyzed and possibly also an attempt must be made to simplify it in an equivalent diagram which substantially corresponds to the actual conditions and at the same time is practicable for calculations. Considering the oscillation phenomenon, which presupposes that at least two parts oscillate in relation to each other, it is often advantageous to consider the network as consisting of two parts joined over certain transmission links having a certain reactance, the rotating masses of each part of the network being symbolized by a single machine. According to this principle, the drawings are constructed so that the symbol for one machine is usually understood to symbolize a group of rotating machines, that is motors and generators.

Figure 1:
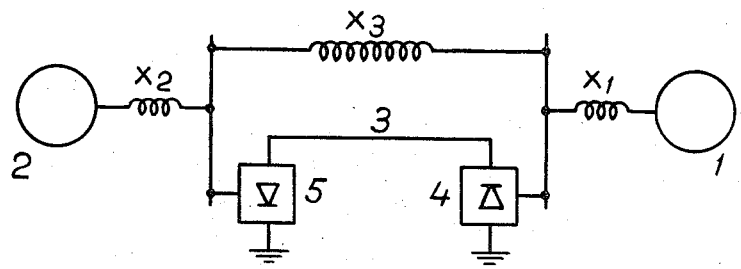

FIG. 1 shows a high voltage network of the type shown in U.S. Pat. No. 3,275,838 having an AC part consisting of two parts symbolized by machines (or groups of machines) 1 and 2 joined over a network with reactances $X_1$, $X_2$, $X_3$. This is preferably a three-phase network, only one phase being shown for the sake of simplicity. The network also contains a DC part in the form of a synchronous DC link in the form of a DC line 3 connected to the AC part over converter stations 4 and 5. In FIG. 1, $X_3$ symbolizes the reactance of the AC part which is parallel to the DC link, while $X_1$ and $X_2$ symbolize the reactances which are common for the parallel direct and alternating current lines, $X_1$ and $X_2$ also including the corresponding machine reactances, in short the reactances which the power from the DC link must pass to be able to affect the rotating masses of the machines, which are those which oscillate in relation to each other.

If a disturbance is assumed, for example the disappearance of a line in the network, causing an increase of the reactance $X_3$, this means an altered transmission of the AC power, which initiates an oscillation between the machines which must be dampened by modulation of the DC link power. This is done by controlling the converter stations 4 and 5. Modulation of the DC power, however, produces an alteration in the power flux through the reactances $X_1$ and $X_2$, causing altered voltage drop and phase shifting in these parts. This in turn means an alteration of the voltage and phase angle differences between the ends of $X_3$, the transmitted power of which is therefore further altered so that the modulation of the DC power does not give the desired result. A similar condition arises if the machines 1 or 2 are loaded or disconnected.

Figure 2:
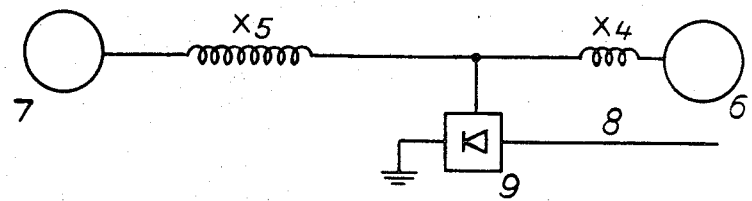

FIG. 2 shows another high voltage network of the type shown in U.S. Pat. No. 3,526,779 with an AC part symbolized by two groups of machines 6 and 7 joined over a network with the reactance $X_4 + X_5$, in which the machine reactances are also included. The DC part here consists of an asynchronous DC link consisting of a DC line 8 which is connected over a converter station 9 to a point on the AC network in the vicinity of the machine 6. Even if the station 9 is connected directly to the terminals on the machine 6 — which is usually impossible — the reactance $X_4$ will in any case include the reactance of the machine 6. The other end of the DC line 8 is connected to another AC network, not shown, over another converter station, not shown either, whereby power can be transmitted between the two AC networks.

Disturbances of the type described in connection with FIG. 1 will also in this case cause one group of machines to be retarded while the other is accelerated and in order to counteract this the DC link power is modulated so that the machine 6 is retarded or accelerated to the same speed as the machine 7. However, because of the distribution of the network reactance over the reactances $X_4$ and $X_5$ the modulation power of the DC link, which may be positive or negative, will be distributed between the machines 6 and 7 corresponding to the reactance distribution even if it is not in linear proportion thereto.

This means, therefore, that the machine 7 acquires a power addition in the same direction as the machine 6 so that the modulation power does not have all the dampening effect that was calculated. An amplification of the modulation gives no improvement since the resultant increase of extra power will also be distributed between the two machines or groups of machines.

Figure 3:
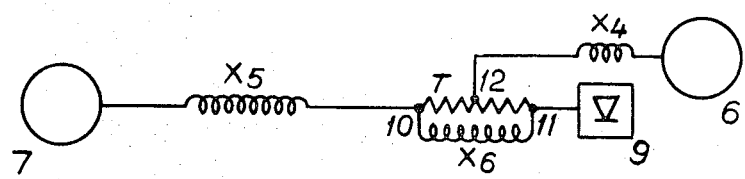
FIGS. 3 and 5 show the use of the invention in the network according to FIG. 2.

In both the cases shown, therefore, it is desirable to eliminate the reactances $X_1$, $X_2$, and $X_4$, respectively, seen from the DC link and according to the invention this can be done with the help of a reactor having intermediate outputs as shown in FIG. 3, corresponding to FIG. 2. In FIG. 3 the output reactor is composed of a reactor $X_6$ connected in parallel with a current distributor or output transformer T and the converter station 9 and network part $X_5$ with the machine group 7 are connected, one to each end of the reactor, while the network part $X_4$ with the machine group 6 is connected to the output terminal.

Figure 4:
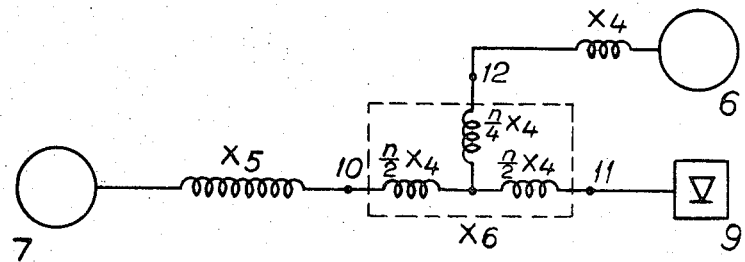
FIG. 4 shows an equivalent diagram for FIG. 3.

If the reactance $X_6$ is expressed as $n \cdot X_4$ and $X_4$ is imagined connected to the middle of T, FIG. 3 can be represented by the equivalent diagram shown in FIG. 4 where the output reactor is shown as composed of three branches having individual reactances as illustrated within the dotted line. The reactance values of these three branches will then be as indicated in FIG. 4, namely $n/2 \cdot X_4$, $n/2 \cdot X_4$ and $-n/4 \cdot X_4$. This is understood best if the impedance is considered between each pair of connection terminals 10, 11 and 12, which has been indicated both in FIG. 3 and in FIG. 4. Between the terminals 10 and 11 the reactance is $n \cdot X_4$ so that the two branches between 10 and 11 in FIG. 4 must each have the reactance $n/2 \cdot X_4$. Between the terminal 12 and each of the terminals 10 and 11 in FIG. 3 only half the reactance $X_6$ is connected so that the reactance between 12 and each of these terminals will be $n/4 \cdot X_4$. For this to agree, however, the reactance in the third branch in FIG. 4, that is in the output branch, must be negative, more specifically $-n/4 \cdot X_4$.

The reactance $X_4$ in the connection to the machine 6 will therefore be reduced by the magnitude $n/4 \cdot X_4$ and if n is chosen equal to four, the reactance $X_4$ will disappear completely. This means that the connection between the machine 6 and the connection to the DC link will be completely without reactance and the above-mentioned distribution between the machines 6 and 7 of the modulation power is avoided. This power will only be supplied to the rotating masses in the machine group 6 so that the stabilizing effect of the power is utilized to the full.

The value $n = 4$ should in principle completely compensate the reactance $X_4$ assuming that the reactance $X_6$ were leak-free, which can never be the case. There may be some justification, therefore, in choosing $n$ greater than four. In many cases, however, it is not necessary to demand such full compensation since a good effect according to the invention should also be able to be achieved with lower reactance values of the reactor $X_6$. Furthermore, the output of the reactor does not necessarily have to be a central output but may be moved slightly in one or the other direction. In certain cases a certain over-compensation might even be feasible. Normally n is chosen somewhere between 2 and 6.

Figure 5:
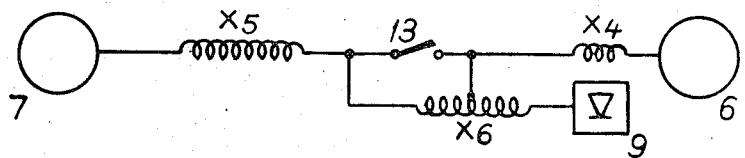

FIG. 5 shows a variation of FIG. 3 in which the compensating reactor $X_6$ is in the form of a single reactor with output. Further, a breaker 13 is shown in FIG. 5 to short-circuit the reactor $X_6$ between $X_4$ and $X_5$ during periods when the DC link is out of operation. In this case the compensating reactor $X_6$ has no function to fulfil, but only gives an addition to the network reactance $X_4 + X_5$, which decreases the stability in the network. During these periods, therefore, it is desirable to short-circuit the reactor.

Figure 6:
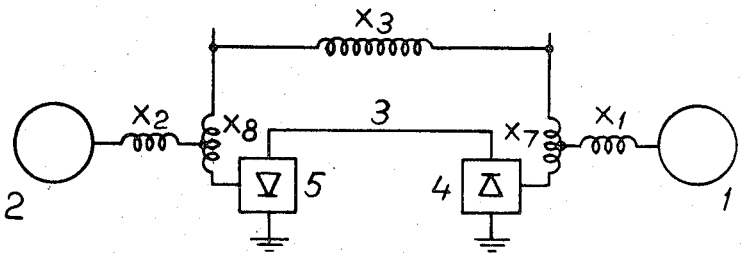
FIG. 6 shows the use of the invention in FIG. 1.

FIG. 6, finally, shows how compensating reactors $X_7$ and $X_8$ according to the invention can be connected into the network according to FIG. 1, whereupon any modulation power is transmitted substantially without reactance between the machine groups 1 and 2 without influencing the transmission over the network $X_3$.

What is claimed is

1. High voltage electric network comprising an AC part and a DC part, a converter station connecting said parts, means to control the converter station to maintain a predetermined power exchange between the two parts of the network and to dampen oscillations arising in the AC part, in which the AC part comprises first and second portions as seen from the connection point of the converter, the connection between the converter station and the AC part comprising an inductive member having an intermediate output which is connected to the first portion of the AC part and which is connected at one end to the second portion of the AC part and at the other end to the converter station.

2. High voltage electric network according to claim 1 in which the second portion of the AC part has a higher impedance than the first portion of the AC part.

3. High voltage electric network according to claim 1, in which said inductive member comprises a reactor connected in parallel with an output transformer.

4. High voltage electric network according to claim 1, in which said inductive member comprises a reactor.

5. High voltage electric network according to claim 4, in which said reactor is provided with a short-circuiting member to short-circuit the reactor when the DC part is not in operation.

6. High voltage electric network according to claim 1, in which the reactance between the ends of said inductive member is $n$ times the short-circuiting reactance of the first portion of the AC network, $n$ having a value between two and six.

7. High voltage electric network according to claim 1, in which the DC part comprises a DC link which joins two points of the AC part over converter stations, the connection of the converter stations at both said points being over intermediate outputs of reactors.

* * * * *